July 2, 1935.  E. FRID  2,006,990
SAW HANDLE
Filed Feb. 8, 1934
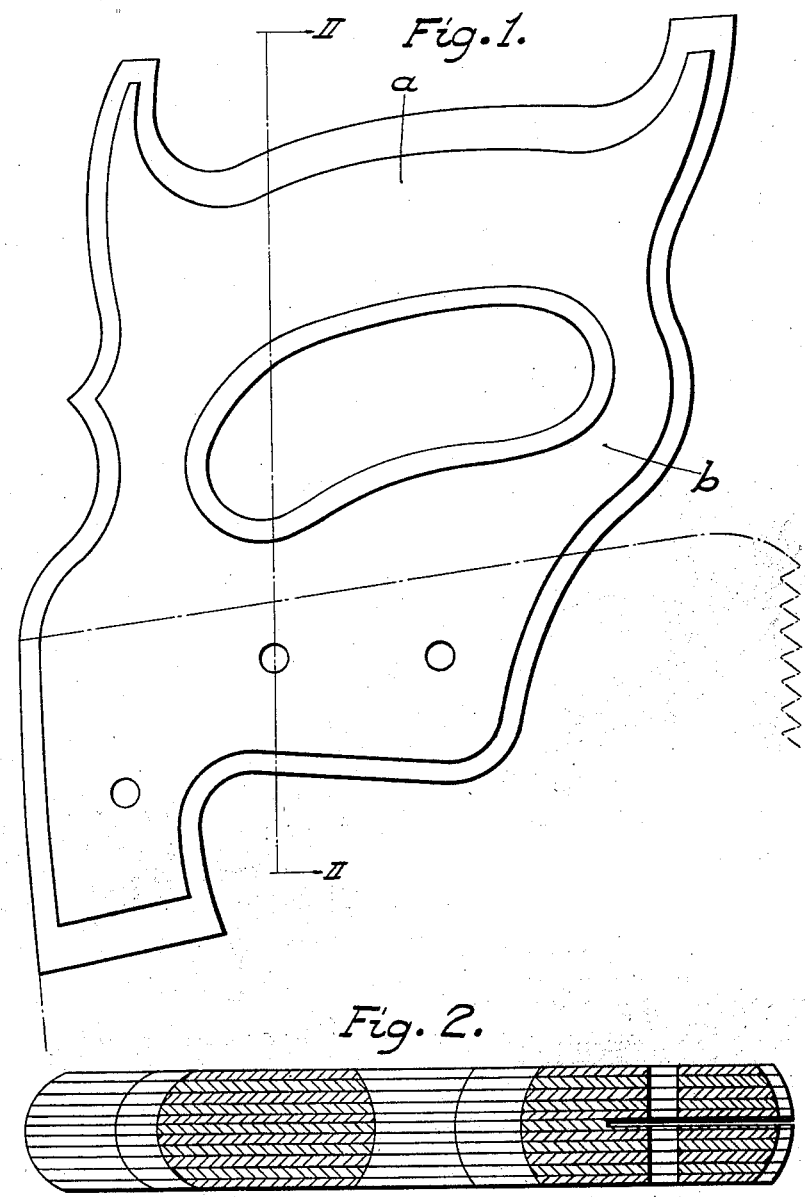
ERIC FRID
INVENTOR
BY Haseltine, Lake & Co.
ATTORNEYS

UNITED STATES PATENT OFFICE 2,006,990

SAW HANDLE

Eric Frid, Edsbyn, Sweden, assignor to Sandvikens Jernverks Aktiebolag, Sandviken, Sweden Application February 8, 1934, Serial No. 710,204
In Sweden February 27, 1933

2 Claims. (Cl. 145—113)

The types of saw handles, particularly for so-called fox saws, to be had in the market have the drawback that they easily crack at the cross pieces. Particularly the grip is liable to crack, but the handles often break also just before the lowermost portion of the recess in the handle. Thus the duration of a handle is considerably shorter than that of the saw blade proper.

Many solutions have been proposed to overcome the said drawbacks; the grip is prevented from cracking for example by applying reinforced bolts or screws therein, but still the other weak portions remain.

The present invention relates to a method of manufacturing saw handles of a type, which possesses the same strength all the way through, and is characterized in that the saw handle is sawed or cut out in such a way from a board consisting of a number of glued veneer layers, the sides of which board are parallel to the superficial layers facing each other, that the said sides form the parallel sides of the saw handle, a recess being made in the intermediate portion so as to obtain a slit for securing the saw handle.

An embodiment of a saw handle manufactured according to the invention is illustrated in the accompanying drawing.

Fig. 1 is a side view of the saw handle, and Fig. 2 is a section along the line II—II of Fig. 1.

The saw handle is cut or sawed out from a board made from plywood, the number of the glued wood layers forming the width of the handle. By this the handle gets the same strength all the way through, thus also at the points $a$ and $b$, which are especially weak in the usual handles. Further a crimping of the wood is prevented in the said handles, which crimping, as is known, mainly takes place across the grain, and which in the handles used hitherto has caused them to crack above the screw or rivet holes after the handles have been riveted or secured to the saw blades.

The handle may preferably be manufactured from an odd number of wood layers, in which case, prior to the layers being glued, a piece is cut off from the intermediate layer so that, when the layers have been glued together, a slit is formed for the saw blade in the handle.

Having now described my invention, what I claim as new and desire to secure by Letters Patent is:

1. A saw handle, in which there is a handle portion proper with a slotted portion for receiving the fingers within said handle portion proper, comprising an odd number of superposed plies of veneer wood disposed in planes parallel with the sides of the handle and secured into a unit wherein the middle ply is formed with a narrow open slot intermediate the sides of the same, and the other plies extend in continuous manner throughout said handle and about said slotted portion so as to form the handle portion proper and provide a maximum structural strength therefor, which narrow open slot extends a distance into said middle ply in parallelism with the sides of the said handle in order to receive the end of a saw blade and is narrower than said middle ply so that portions of said middle ply extend along both sides of said slot.

2. A saw handle, in which there is a handle portion proper with a slotted portion for receiving the fingers within said handle portion proper, comprising an odd number of superposed plies of veneer wood disposed in planes parallel with the sides of the handle and glued into a unit, wherein the middle ply at one end has a different form than the other plies by having a narrow open slot which is parallel with said sides and adapted to receive the end of a saw blade a limited distance into said handle, and said plies extend in continuous manner throughout said handle and about said slotted portion so as to form the handle portion proper and provide a maximum structural strength therefor.

ERIC FRID.